US009251989B2

(12) United States Patent
Wei et al.

(10) Patent No.: US 9,251,989 B2
(45) Date of Patent: Feb. 2, 2016

(54) METHOD OF MAKING FIELD EMITTER

(71) Applicants: Tsinghua University, Beijing (CN); HON HAI PRECISION INDUSTRY CO., LTD., New Taipei (TW)

(72) Inventors: Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/738,949

(22) Filed: Jun. 15, 2015

(65) Prior Publication Data

US 2015/0364287 A1 Dec. 17, 2015

(30) Foreign Application Priority Data

Jun. 17, 2014 (CN) .......................... 2014 1 0269167

(51) Int. Cl.
*H01J 9/02* (2006.01)
*B82Y 99/00* (2011.01)
*B82Y 40/00* (2011.01)

(52) U.S. Cl.
CPC ................ *H01J 9/025* (2013.01); *B82Y 40/00* (2013.01); *B82Y 99/00* (2013.01); *Y10S 977/742* (2013.01); *Y10S 977/939* (2013.01)

(58) Field of Classification Search
CPC ............... H01J 2329/0455; H01J 2201/30469; H01J 9/025
See application file for complete search history.

(56) References Cited

U.S. PATENT DOCUMENTS

| | | | | |
|---|---|---|---|---|
| 2006/0284537 A1* | 12/2006 | Tolt | ......................... | H01J 1/304 313/306 |
| 2009/0078578 A1* | 3/2009 | Lin et al. | ................. | B82Y 10/00 205/125 |
| 2012/0248967 A1* | 10/2012 | Li et al. | ................... | H01J 1/304 313/496 |
| 2013/0260634 A1* | 10/2013 | Liu et al. | ................. | H01J 9/025 445/51 |

* cited by examiner

*Primary Examiner* — Nimeshkumar Patel
*Assistant Examiner* — Jacob R Stern
(74) *Attorney, Agent, or Firm* — Novak Druce Connolly Bove + Quigg LLP (57) ABSTRACT

A method of making a field emitter includes following steps. A carbon nanotube layer is provided, and the carbon nanotube layer includes a first surface and a second surface opposite to each other. A carbon nanotube composite layer is formed via electroplating a first metal layer on the first surface and electroplating a second metal layer on the second surface. A first carbon nanotube layer and a second carbon nanotube layer is formed by separating apart the carbon nanotube composite layer, wherein a fracture surface is formed in the carbon nanotube composite layer, a number of first carbon nanotubes in the first carbon nanotube layer are exposed from the fracture surface, and a number of second carbon nanotubes in the second carbon nanotube layer are exposed from the fracture surface.

17 Claims, 7 Drawing Sheets

METHOD OF MAKING FIELD EMITTER

CROSS-REFERENCE TO RELATED APPLICATIONS

This application claims all benefits accruing under 35 U.S.C. §119 from China Patent Application No. 201410269167.8, filed on Jun. 17, 2014, in the China Intellectual Property Office, the contents of which are hereby incorporated by reference.

BACKGROUND

1. Technical Field

The present disclosure relates to a method of making a field emitter, especially relates to a method of making a field emitter based on carbon nanotubes.

2. Description of Related Art

Field emission displays (FEDs) are a new, rapidly developing flat panel display technology. Generally, FEDs can be roughly classified into diode and triode structures. In particular, carbon nanotube-based FEDs have attracted much attention in recent years.

Field emission cathode devices are important elements in FEDs. A method for making field emission cathode device usually includes the steps of: providing an insulating substrate; forming a cathode electrode on the substrate; forming a dielectric layer on the cathode electrode; and depositing a plurality of carbon nanotubes on the exposed cathode electrode as the electron emitter. However, the carbon nanotubes fabricated by the CVD method are not secured on the cathode electrode. The carbon nanotubes are prone to be pulled out from the cathode electrode by a strong electric field force, thus causing the field emission cathode device to have a short lifespan.

What is needed, therefore, is to provide a method for making a field emitter, which can overcome the above-described shortcomings.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
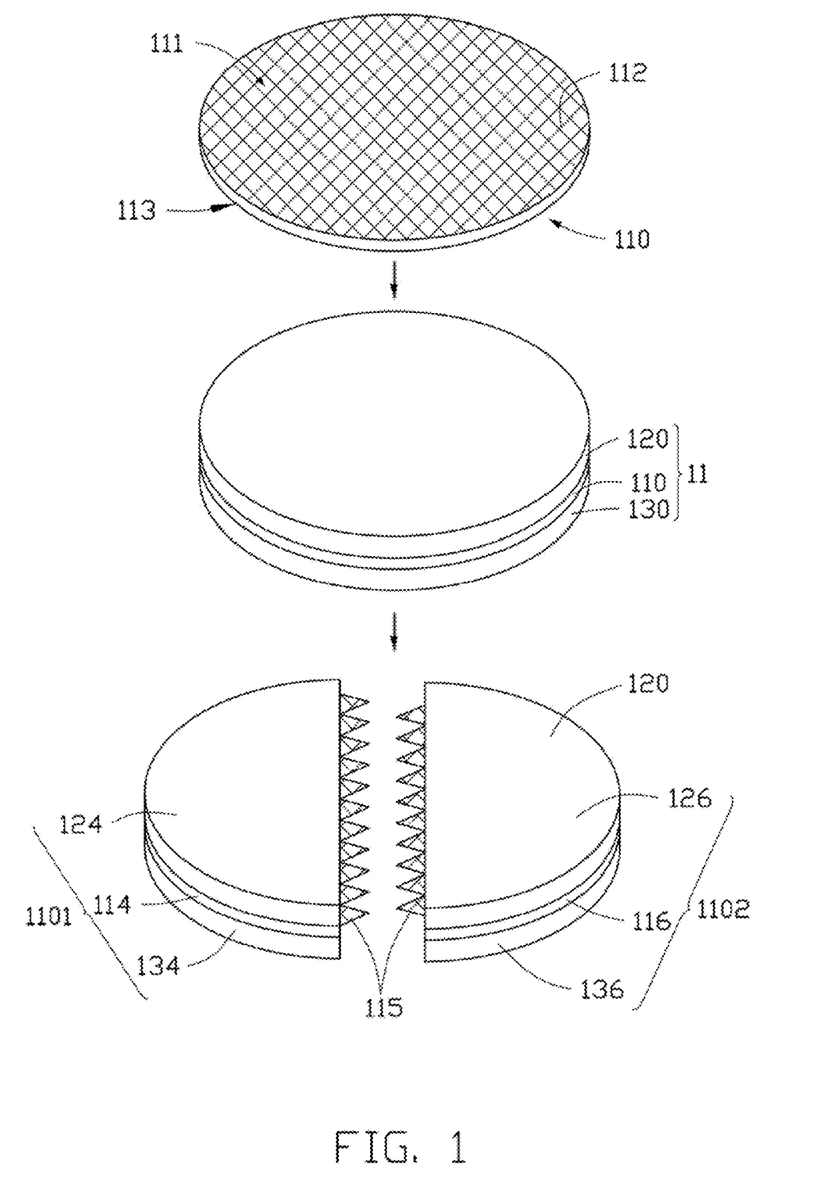
FIG. 1 shows a flowchart of one embodiment of a method of making field emitter.
Figure 2:
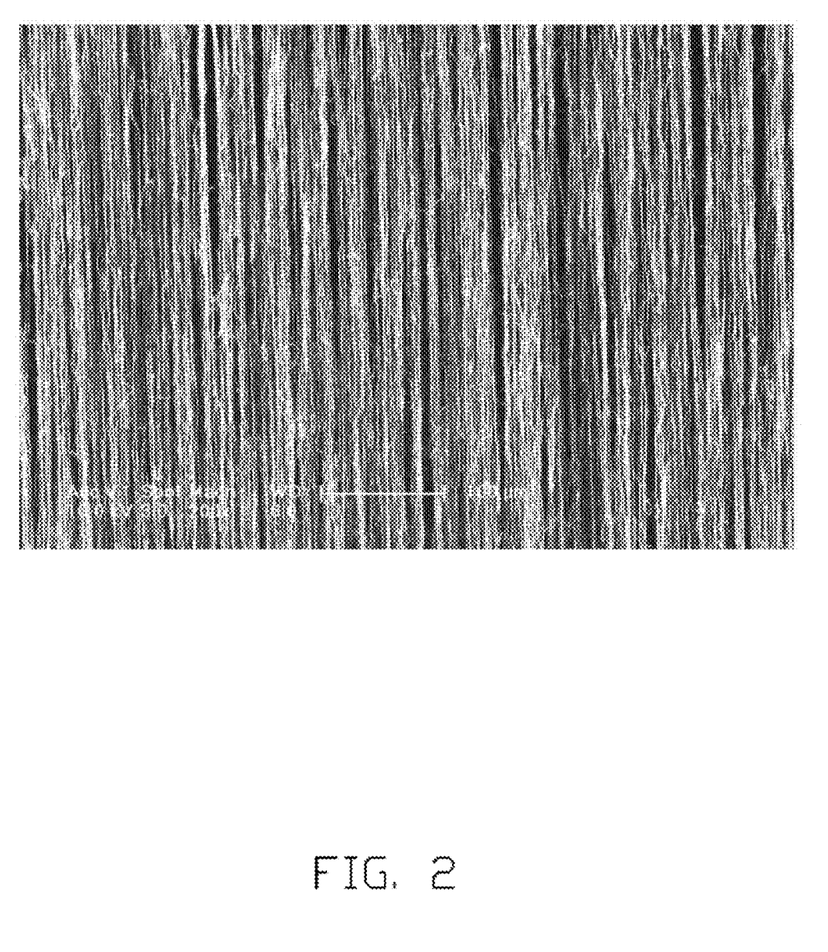
FIG. 2 shows a Scanning Electron Microscope (SEM) image of one embodiment of a carbon nanotube film in the method of FIG. 1.

Referring to FIG. 1, one embodiment of a method of making field emitter 10 comprises:

step (S10), providing a carbon nanotube layer 110, wherein the carbon nanotube layer 110 comprises a first surface 111 and a second surface 113 opposite to each other, and the carbon nanotube layer 110 comprises a plurality of carbon nanotubes;

step (S11), forming a carbon nanotube composite layer 11 via electroplating a first metal layer 120 on the first surface 111 and electroplating a second metal layer 130 on the second surface 113; and step (S12), forming a plurality of electron emitters 115 by separating the carbon nanotube composite layer 11, wherein the carbon nanotube composite layer 11 is cut into a first carbon nanotube composite layer 1101, and a second carbon nanotube composite layer 1102.

In step (S10), the carbon nanotube layer 110 can be located on a support (not shown). Furthermore, the carbon nanotube layer 110 can be suspended on a frame (not shown). The carbon nanotube layer 110 is a free-standing structure, and the carbon nanotube layer 110 can be suspended on the support or the frame.

Figure 3:
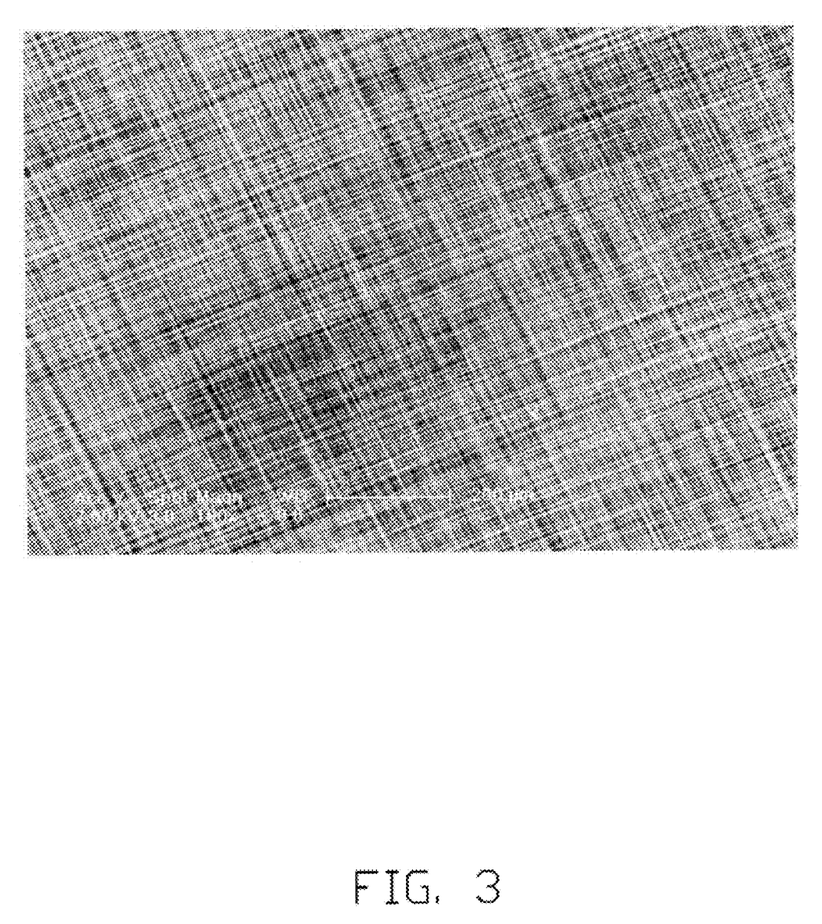
FIG. 3 shows a SEM image of one embodiment of a carbon nanotube layer.

The carbon nanotube layer 110 comprises a plurality of carbon nanotube films stacked together. Referring to FIG. 3, each of the plurality of carbon nanotube films comprises a plurality of carbon nanotubes. The plurality of carbon nanotubes that can be arranged substantially parallel to a surface of the carbon nanotube film. A large number of the carbon nanotubes in the carbon nanotube film can be oriented along a preferred orientation, meaning that a large number of the carbon nanotubes in the carbon nanotube film are arranged substantially along the same direction. An end of one carbon nanotube is joined to another end of an adjacent carbon nanotube arranged substantially along the same direction, by Van der Waals attractive force. A small number of the carbon nanotubes may be randomly arranged in the carbon nanotube film, and has a small if not negligible effect on the larger number of the carbon nanotubes in the carbon nanotube film arranged substantially along the same direction. The carbon nanotube film is capable of forming a free-standing structure. The term "free-standing structure" can be defined as a structure that does not have to be supported by a substrate. For example, a free standing structure can sustain the weight of itself when it is hoisted by a portion thereof without any significant damage to its structural integrity. So, if the carbon nanotube film is placed between two separate supporters, a portion of the carbon nanotube film, not in contact with the two supporters, would be suspended between the two supporters and yet maintain film structural integrity.

The plurality of carbon nanotubes in different carbon nanotube films can be intersected with each other. Thus the plurality of carbon nanotube films forms a network. A plurality of apertures 112 are defined in the carbon nanotube layer 110. The plurality of apertures 112 are through holes along the thickness of the carbon nanotube layer 110. In one embodiment, the carbon nanotube layer is suspended on the frame.

Figure 4:
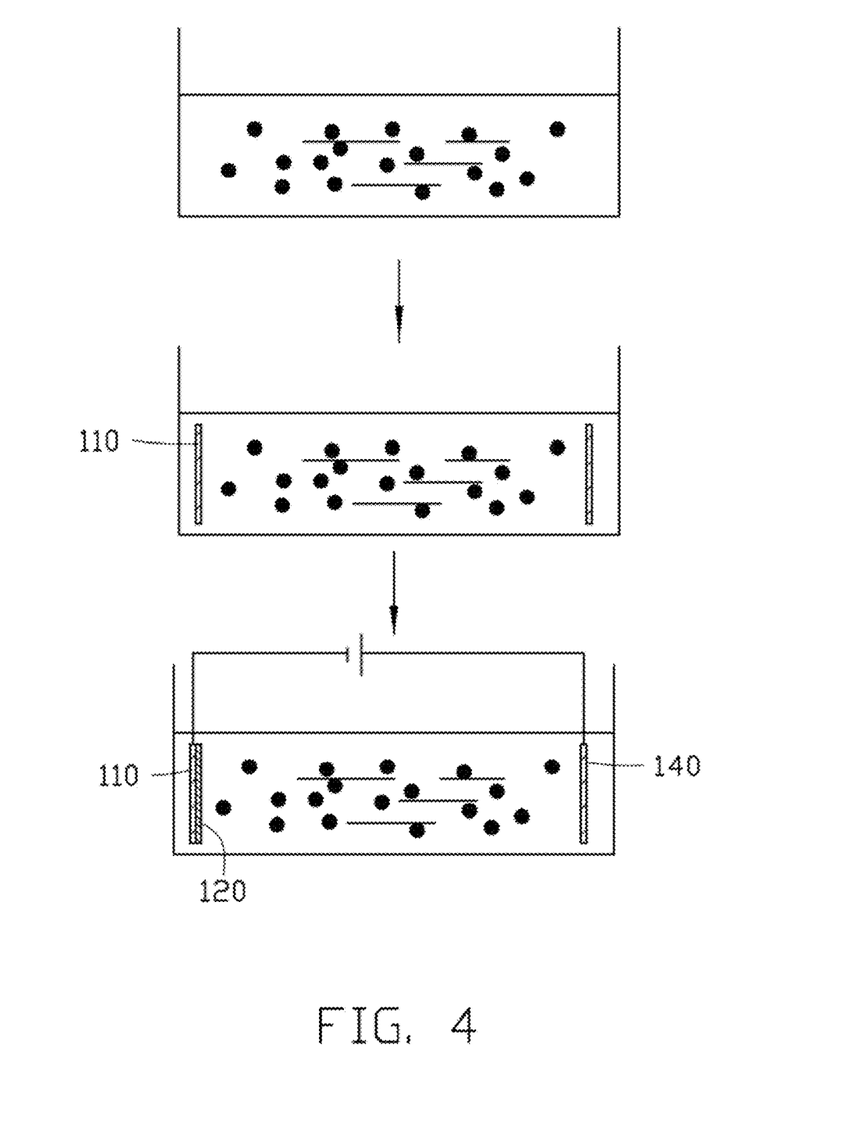
FIG. 4 shows a flowchart of one embodiment of electroplating metal layer on the carbon nanotube layer.

In step (S11), the first metal layer 120 is deposited on the first surface 111 via electroplating method. The second metal layer 130 is deposited on the second surface 113. The first metal layer 120 and the second metal layer 130 can be formed by: step (S111), providing a metal ions solution, wherein the metal ions solution comprises a plurality of metal ions;

step (S112), immersing the carbon nanotube layer 110 into the metal ions solution, wherein the first surface 111 and the second surface 113 are exposed in the metal ions solution, and the carbon nanotube layer 110 is spaced from a electrode plate 140; and step (S113), applying a voltage between the carbon nanotube layer 110 and the electrode plate 140, wherein the plurality of metal ions are reduced into metal particles and coated on the first surface 111 and the second surface 113.

In step (S111), the density of the plurality of metal ions can be selected according to the thickness of the first metal layer 120 and the second metal layer 130. In one embodiment, the plurality of metal ions are formed by dissolving cooper sulfate into the water.

In step (S112), the carbon nanotube layer 110 is spaced from the electrode plate 140. A distance between the carbon nanotube layer 110 and the electrode plate 140 can range from about 0.5 millimeters to about 3 millimeters. The carbon nanotube layer 110 can be parallel with the electrode plate 140. The material of the electrode plate 140 can be graphene, platinum, stainless steel, or carbon nanotube layer structure. The material of the electrode plated 140 can be inertia material in the metal ions solution. The size of the electrode plate 140 can be greater than the carbon nanotube layer.

The carbon nanotube layer 140 can be suspended in the metal ions solution. Furthermore, because the carbon nanotube layer 140 is fixed on the frame, the carbon nanotube layer 140 in the frame will be exposed in the metal ions solution. In one embodiment, the electrode plate 140 is copper plate, and the size of the copper plate is greater than the carbon nanotube layer 110.

In step (S113), a potential difference is applied between the carbon nanotube layer 110 and the electrode plate 140. The electrode plate 140 is electrically connected to a positive electrode, and the carbon nanotube layer 110 is electrically connected to a negative electrode. Thus the metal ions will be reduced into metal particles, and the metal particles will be deposited on the carbon nanotube layer 110. Furthermore, the metal particles are deposited on an outer surface of each of the plurality of carbon nanotubes. During the process of electroplating, a plurality of dangling bonds are formed on the outer surface of the plurality of carbon nanotubes, and the metal particles are tightly combined with the plurality of carbon nanotubes via the plurality of dangling bonds. Furthermore, the plurality of metal particles are connected with each other to form a continuous layered structure on the first surface 111 and the second surface 113. Thus both the first metal layer 120 and the second metal layer 130 are continuously layered structure. In addition, the metal particles can be deposited on the outer surface of adjacent carbon nanotubes around each of the plurality of apertures 112. Thus the first metal layer 120 and the second metal layer 130 are combined together to form an integrated structure. The carbon nanotube layer 110 is firmly sandwiched between the first metal layer 120 and the second metal layer 130.

In one embodiment, a constant voltage is applied between the carbon nanotube layer 110 and the electrode plate 140. The potential difference between the carbon nanotube layer 110 and the electrode plate 140 ranges from about 0.5 V to about 1.2 V, and an electroplating time range from about 0.5 hours to about 4 hours.

Furthermore, the first metal layer 120 and the second metal layer 130 can be formed one after another. In one embodiment, the second surface 113 can be attached on a substrate (not shown), and the first surface 111 is exposed in the metal ion solution. The first metal layer 120 can be formed on the first surface 111. The carbon nanotube layer 110 with the first metal layer 120 is turned over, and the second surface 113 is exposed in the metal ion solution. The second metal layer 130 is formed on the second surface 113.

Furthermore, during forming the second metal layer 130, the metal particles can be deposited into the plurality of apertures 112. Thus the second metal layer 130 can penetrate the carbon nanotube layer 110 and combined with the first metal layer 120 through the plurality of apertures 112. The carbon nanotube layer 110 is sandwiched between the first metal layer 120 and the second metal layer 130.

Furthermore, the carbon nanotube composite layer 11 can be washed to remove the impurity. Then the carbon nanotube composite layer 11 can be dried, and the first metal layer 120 and the second metal layer 130 can be tightly attached on the carbon nanotube layer 110.

Figure 5:
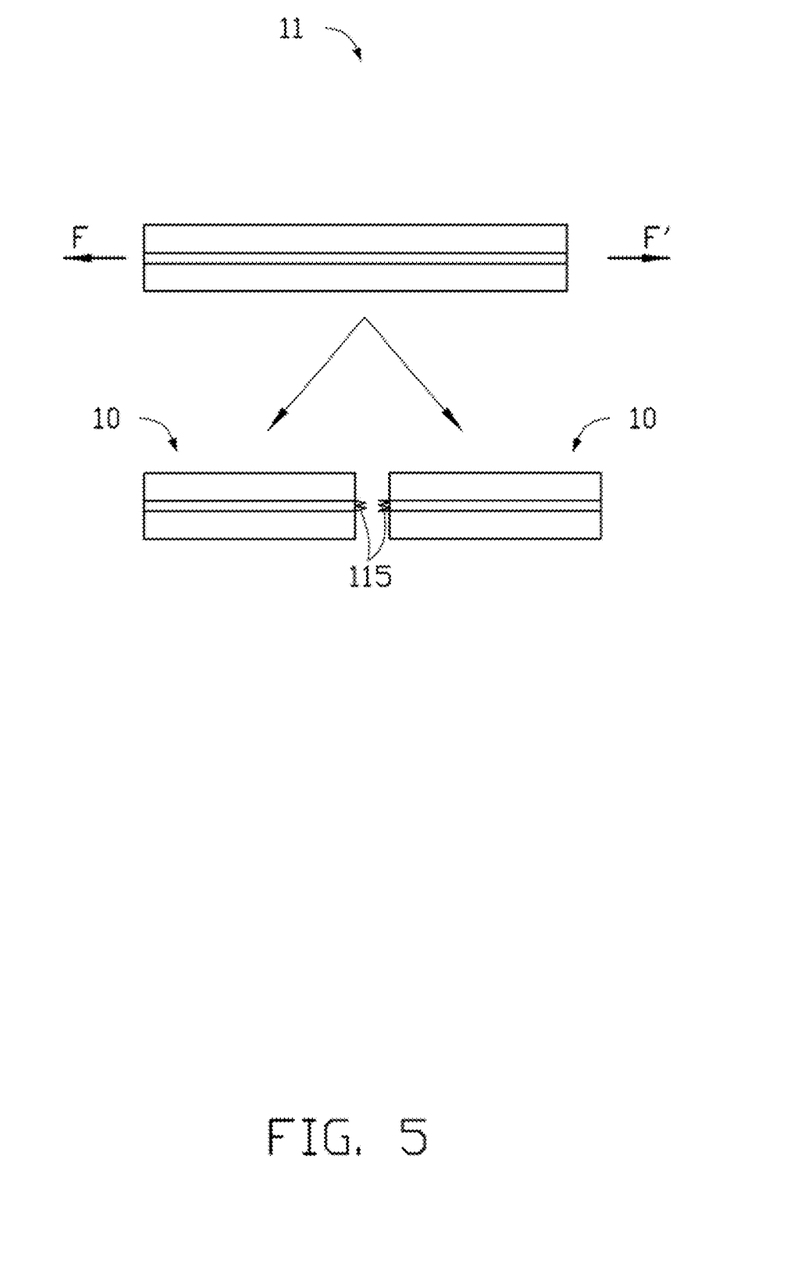
FIG. 5 shows a flowchart of one embodiment of dividing a carbon nanotube composite layer in the method of FIG. 1.

In step (S12), the carbon nanotube composite layer 11 can be cut by applying two opposite forces on two opposite edges of the carbon nanotube composite layer 11. The two opposite forces can be parallel with the first surface 111 and the surface 113. Referring to FIG. 5, the carbon nanotube composite layer 11 can be separated apart by:

step (S121), applying a first force F on a first edge of the carbon nanotube composite layer 11, and applying a second force F' on a second edge of the carbon nanotube composite layer 11, wherein the first edge is opposite to the second edge, and the first force F is opposite to the second force F'; and step (S122), separating the carbon nanotube composite layer 11 by continuously applying the first force F and the second force F', wherein the carbon nanotube composite layer 11 is divided into the first carbon nanotube composite layer 1101 and the second carbon nanotube composite layer 1102.

In step (S121), the first force F and the second force F' can be selected according to the thickness of the carbon nanotube layer 110, the first metal layer 120, and the second metal layer 130, to ensure that the carbon nanotube composite layer 11 can be divided into two pieces. The first force F and the second force F' can be applied on the two opposite edges of the carbon nanotube composite layer 10. The first force F and the second force F' can be applied along a straight line.

The first force F and the second force F' can be applied by pulling the two opposite edges of the carbon nanotube composite layer. Furthermore, the first force F and the second force F' can be applied through nippers. In one embodiment, the carbon nanotube composite layer 11 can also be divided by physically cutting the carbon nanotube composite layer 11 during applying the first force F and the second force F'. Furthermore, the first edge can be fixed, and the second edge is applied with the second force F' to separate the carbon nanotube composite layer 11. In one embodiment, the first force F is equal to the second force F'.

In step (S122), the carbon nanotube composite layer 11 can be separated along a direction perpendicular with the carbon nanotube composite layer. A fracture surface is formed in the carbon nanotube composite layer 11, and the carbon nanotube composite layer 11 is divided into two pieces by the fracture surface. Some carbon nanotubes will be exposed along the fracture surface. In one embodiment, the carbon nanotube composite layer 11 can be divided through the center of the carbon nanotube composite layer 11. Thus the first carbon nanotube composite layer 1101 and the second carbon nanotube composite layer 1102 have the same size. The carbon nanotube layer 110 is divided into the first carbon nanotube layer 114 and the second carbon nanotube layer 116. In one embodiment, the first carbon nanotube layer 114 and the second carbon nanotube layer 116 have the same size. The first metal layer 120 is divided into a first portion 122 and a second portion 126. The second metal layer 130 is divided into a third portion 132 and the fourth portion 136. The first carbon nanotube layer 114 is sandwiched between the first portion 122 and the third portion 132. The second carbon nanotube layer 116 is also sandwiched between the second portion 126 and the fourth portion 136. Furthermore, the plurality of carbon nanotubes are exposed through the first portion 122 and the third portion 132. The plurality of carbon nanotubes are also exposed through the second portion 126 and the fourth portion 136. The plurality of carbon nanotubes form the plurality of emitters 115. The plurality of emitters 115 can be aligned along the fracture surface of the carbon nanotube composite layer 11.

During separating the carbon nanotube layer 110, the plurality of carbon nanotubes in the carbon nanotube layer 110 will be horizontal separated. Some of the plurality of carbon nanotubes will be partly pull out of the carbon nanotube layer 110. The plurality of carbon nanotubes will be extend out of the first carbon nanotube composite layer 1101 and the second carbon nanotube composite layer 1102. Furthermore, in the first carbon nanotube composite layer 1101, one end of each of the plurality of carbon nanotubes is still firmly sandwiched between the first portion 124 and the third portion 126, and another end of each of the plurality of carbon nanotubes is configured to emit electrons. At the same time, in the second carbon nanotube composite layer 1102, one end of each of the plurality of carbon nanotubes is also fixed between the second portion 126 and the fourth portion 136, and another end of each of the plurality of carbon nanotubes is configured to emit electrons.

Figure 6:
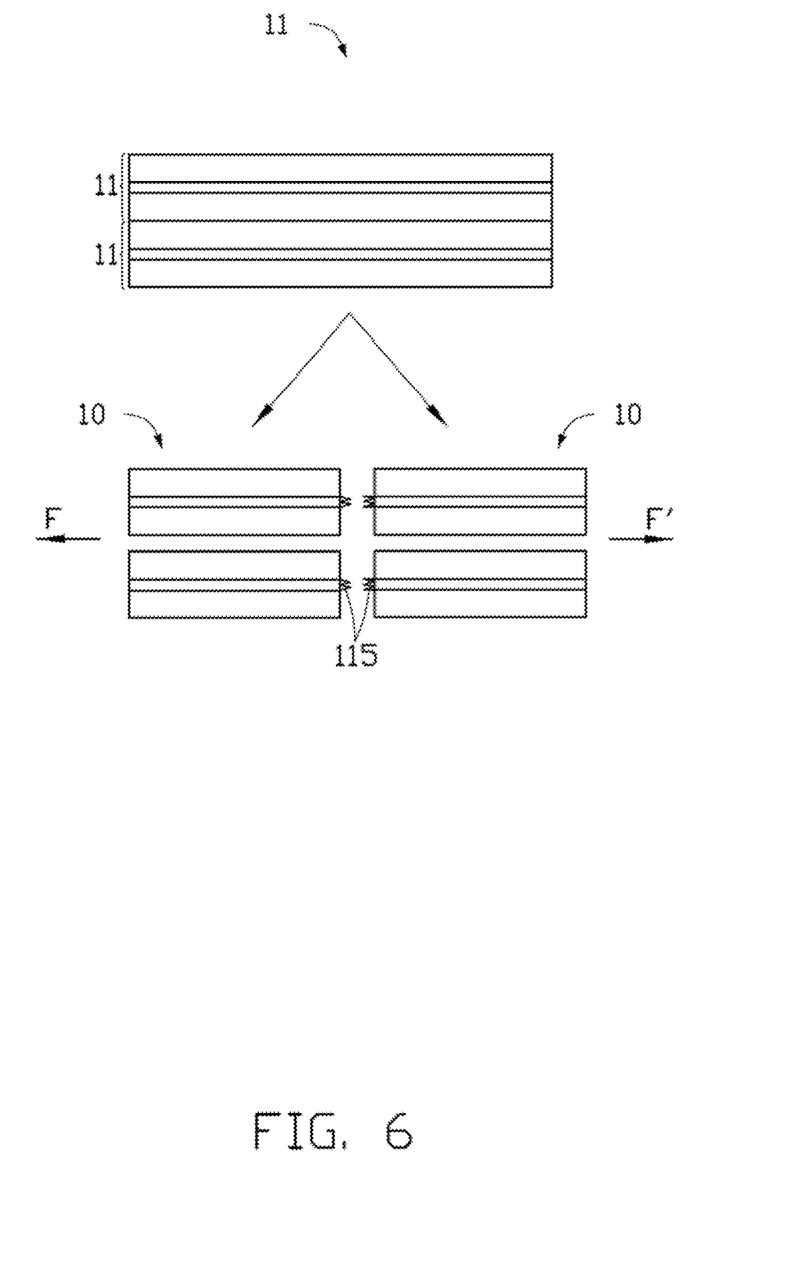
FIG. 6 shows a flowchart of another embodiment of dividing a plurality of carbon nanotube composite layer.
Figure 7:
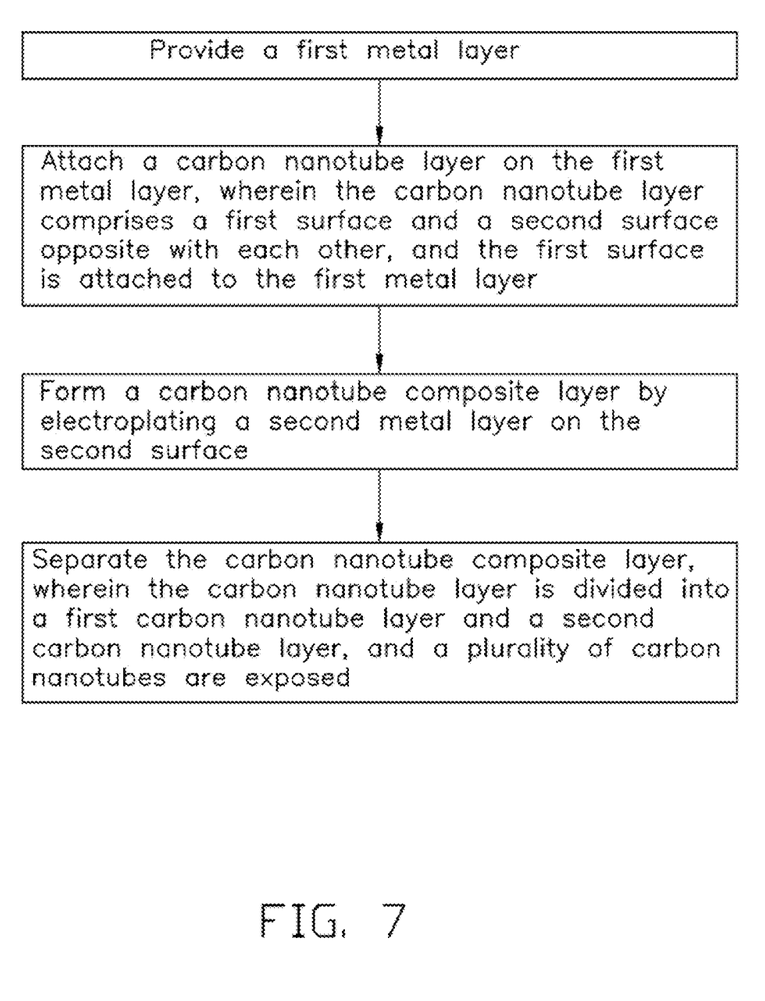
FIG. 7 shows a flowchart of another embodiment of a method of making field emitter.

Referring to FIG. 6, before separating the carbon nanotube composite layer 11, the method of making field emitter 10 further comprises:

step (S12'), stacking a plurality of carbon nanotube composite layers 11; and step (S13'), forming a plurality of field emitters 115 by separating the plurality of carbon nanotube composite layers 11.

In step (S12'), the number of the plurality of the carbon nanotube layers 11 can be selected according to need. Furthermore, the plurality of carbon nanotube composite layers 11 have the same shape and same area. The plurality of carbon nanotube composite layers 11 are overlapped with each other.

In step (S13'), the field emitter 10 can be used as a single field emitter to increase electron emission density and electron emission power. Furthermore, the field emitter 10 can be separated in to a plurality of field emitter units.

The method of making field emitter has following advantages. The first metal layer and the second metal layer are formed on the carbon nanotube layer via electroplating method, thus the first metal layer and the second metal layer can be bonded on the carbon nanotube layer, and the carbon nanotubes can be tightly combined with the metal layer. The stability of the field emitter can be improved. Furthermore, the electron emitter can withstand a strong electric field force.

Referring to FIG. 6, another embodiment of a method of making field emitter 10 comprises:

step (S20), providing a first metal layer 120;

step (S21), attaching a carbon nanotube layer 110 on the first metal layer 120, wherein the carbon nanotube layer 110 comprises a first surface 111 and a second surface 113 opposite with each other, and the first surface 111 is attached to the first metal layer 120;

step (S22), forming a carbon nanotube composite layer 11 by electroplating a second metal layer 130 on the second surface 113; and step (S23), separating the carbon nanotube composite layer 11, wherein the carbon nanotube layer 110 is divided into a first carbon nanotube layer 114 and a second carbon nanotube layer 116, and a plurality of carbon nanotubes are exposed.

The method of making field emitter 10 in this embodiment is similar with the method of making field emitter 10 in the embodiment described above, except that the carbon nanotube layer 110 is firstly attached on the first metal layer 120, and the second metal layer 130 is then electroplated on the carbon nanotube layer 110 and combined with the first metal layer 120.

In step (S21), the first metal layer 120 can be tightly combined with the carbon nanotube layer 110 and support the carbon nanotube layer 110. In one embodiment, a thickness of the metal layer 120 is about 10 micrometers. Thus the first metal layer 120 has certain mechanical strength.

In step (S22), during the process of the depositing the second metal layer 130, the second metal layer 130 will be penetrate the carbon nanotube layer 110 through the plurality of apertures 112 in the carbon nanotube layer 110. Thus the second metal layer 130 will be integrated with the first metal layer 120 to form an integrated structure. The carbon nanotube layer 110 is firmly sandwiched between the first metal layer 120 and the second metal layer 130.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method of making a field emitter, the method comprising:

providing a carbon nanotube layer comprising a first surface and a second surface opposite to the first surface, wherein the carbon nanotube layer comprises a plurality of carbon nanotubes;

forming a carbon nanotube composite layer via electroplating a first metal layer on the first surface and electroplating a second metal layer on the second surface; and dividing the carbon nanotube composite layer, wherein the first metal layer is separated into a first portion and a second portion, the carbon nanotube layer is divided into a first carbon nanotube layer comprising a plurality of first carbon nanotubes and a second carbon nanotube layer comprising a plurality of second carbon nanotubes, the second metal layer is separated into a third portion and a fourth portion, the first carbon nanotube layer is sandwiched between the first portion and the third portion, the second carbon nanotube layer is sandwiched between the second portion and the fourth portion, some of the plurality of first carbon nanotubes extend out of the first portion and the second portion, and some of the plurality of second carbon nanotubes extend out of the second portion and the fourth portion.

2. The method of claim 1, wherein a plurality of apertures are defined in the carbon nanotube layer by the plurality of carbon nanotubes.

3. The method of claim 2, wherein the carbon nanotube layer is a free-standing structure, and the plurality of apertures penetrate the carbon nanotube layer along a direction of a thickness of the carbon nanotube layer.

4. The method of claim 2, wherein the first metal layer and the second metal layer are in direct contact with each other through the plurality of apertures to form an integrated structure.

5. The method of claim 2, wherein the first metal layer and the second metal layer are formed by:
provided a metal ions solution, wherein the metal ions solution comprises a plurality of metal ions;
immersing the carbon nanotube layer into the metal ions solution, wherein the first surface and the second surface are exposed in the metal ions solution, and the carbon nanotube layer is spaced from an electrode plate in the metal ions solution; and
applying a voltage between the carbon nanotube layer and the electrode plate, wherein the plurality of metal ions are reduced into a plurality of metal particles and coated on the first surface and the second surface.

6. The method of claim 5, wherein the plurality of metal particles are continuously deposited on the first surface and the second surface, and both the first metal layer and the second metal layer are continuous structure.

7. The method of claim 5, wherein a plurality of dangling bonds are formed on an outer surface of each of the plurality of carbon nanotubes, and the plurality of metal particles are combined with the plurality of carbon nanotubes via the plurality of dangling bonds.

8. The method of claim 5, wherein the plurality of metal particles are deposited into the plurality of apertures and coated on some of the plurality of carbon nanotubes that are around each of the plurality of apertures.

9. The method of claim 1, wherein the carbon nanotube layer comprises a plurality of carbon nanotube films, the plurality of carbon nanotubes in each of the plurality of carbon nanotube films are oriented along a preferred orientation, and the preferred orientation in different carbon nanotube films are intersected with each other.

10. The method of claim 1, wherein the carbon nanotube composite layer is separated apart by:
applying a first force on a first edge of the carbon nanotube composite layer, and applying a second force on a second edge of the carbon nanotube composite layer, wherein the first edge is opposite to the second edge, and the first force is opposite to the second force; and
separating the carbon nanotube composite layer by continuously applying the first force and the second force, wherein the carbon nanotube layer is divided into the first carbon nanotube layer and the second carbon nanotube layer, and some of the plurality of carbon nanotubes are exposed from where the carbon nanotube layer is divided and configured as a plurality of electron emitters.

11. The method of claim 10, wherein the first force and the second force are parallel with the carbon nanotube composite layer, the first force is equal to the second force, and the carbon nanotube composite layer is divided into two pieces having the same area.

12. The method of claim 1, wherein the carbon nanotube layer is circular, and the carbon nanotube layer is separated along a diameter, and some of the plurality of carbon nanotubes are exposed and aligned along the diameter after the dividing the carbon nanotube composite layer.

13. A method of making a field emitter, the method comprising:
providing a first metal layer;
attaching a carbon nanotube layer on the first metal layer, wherein the carbon nanotube layer comprises a first surface and a second surface opposite to each other, the first surface is attached on the first metal layer, and the carbon nanotube layer comprises a plurality of carbon nanotubes;
forming a carbon nanotube composite layer via electroplating a second metal layer on the second surface; and
forming a first carbon nanotube composite layer and a second carbon nanotube composite layer by separating apart the carbon nanotube composite layer, wherein the first carbon nanotube composite layer comprises a first fracture surface, the second carbon nanotube composite layer comprises a second fracture surface, a plurality of first carbon nanotubes extend out of the first fracture surface, a plurality of second carbon nanotubes extend out of the second fracture surface.

14. The method of claim 13, wherein the carbon nanotube layer defines a plurality of apertures, and the second metal layer penetrates into the plurality of apertures and combined with the first metal layer.

15. The method of claim 13, wherein each of the plurality of first carbon nanotubes comprises a first end and a second end opposite to the first end, the first end is fixed into the first fracture surface, and the second end is exposed and extends out of the first fracture surface.

16. The method of claim 13, wherein each of the plurality of second carbon nanotubes comprises a first end and a second end opposite to the first end, the first end is fixed into the second carbon nanotube composite layer, and the second end is exposed and extends out of the second fracture surface.

17. A method of making a field emitter, the method comprising:
providing a carbon nanotube layer comprising a first surface and a second surface opposite to each other, wherein the carbon nanotube layer comprises a plurality of carbon nanotubes and defines a plurality of apertures;
forming a carbon nanotube composite layer via electroplating a first metal layer on the first surface and electroplating a second metal layer on the second surface, wherein the carbon nanotube layer is sandwiched between the first metal layer and the second metal layer, and the first metal layer and the second metal layer penetrate the plurality of apertures and combined together; and
separating apart the carbon nanotube composite layer by applying a first force and a second force opposite to each other, wherein the first force and the second force are parallel with the carbon nanotube composite layer, a fracture surface is formed by separating the carbon nanotube composite layer, the carbon nanotube layer is divided into a first carbon nanotube layer and a second carbon nanotube layer; a plurality of first carbon nanotubes in the first carbon nanotube layer are exposed from the fracture surface, and a plurality of second carbon nanotubes in the second carbon nanotube layer are exposed from the fracture surface.

* * * * *